United States Patent [19]

Lang et al.

[11] Patent Number: 5,244,544
[45] Date of Patent: Sep. 14, 1993

[54] PROCESS FOR THE SEPARATION OF MULTICOMPONENT SYSTEMS CONTAINING INTERMEDIATE BOILING SUBSTANCES IN SEPARATING COLUMNS WITH SIDE DISCHARGE

[75] Inventors: Lothar Lang, Cologne; Franz F. Rhiel, Dormagen; Günther Weymans, Leverkusen, all of Fed. Rep. of Germany

[73] Assignee: Bayer Aktiengesellschaft, Leverkusen, Fed. Rep. of Germany

[21] Appl. No.: 880,815

[22] Filed: May 8, 1992

[30] Foreign Application Priority Data

May 21, 1991 [DE] Fed. Rep. of Germany ....... 4116536

[51] Int. Cl.⁵ .............................................. B01D 3/42
[52] U.S. Cl. .......................................... 203/2; 203/99;
203/DIG. 18; 203/DIG. 19; 202/160; 202/206;
374/141; 374/166
[58] Field of Search ............ 203/1, 2, 99, 3, DIG. 23,
203/DIG. 18, DIG. 19; 374/110, 166, 141;
202/160, 206

[56] References Cited

U.S. PATENT DOCUMENTS

| | | | |
|---|---|---|---|
| 2,684,326 | 5/1949 | Boyd, Jr. | |
| 3,338,825 | 8/1967 | Taggart | 203/2 |
| 3,405,035 | 10/1968 | Boyd | 203/2 |
| 3,408,265 | 10/1968 | Ward | 203/2 |
| 3,463,725 | 8/1969 | MacFarlane et al. | 203/99 |
| 3,773,627 | 11/1973 | Weber et al. | 203/2 |
| 3,830,698 | 8/1974 | Kleiss | 203/2 |
| 3,855,074 | 12/1974 | Mosler et al. | 203/2 |
| 4,529,484 | 7/1985 | Ryan | 203/2 |
| 4,557,806 | 12/1985 | Stengle et al. | 203/2 |
| 4,560,442 | 12/1985 | Jain | 203/99 |
| 4,894,145 | 1/1990 | Jensen | 203/2 |

FOREIGN PATENT DOCUMENTS

| | | | |
|---|---|---|---|
| 2105840 | 8/1971 | France | |
| 0596263 | 3/1978 | U.S.S.R. | 203/2 |
| 0628939 | 10/1978 | U.S.S.R. | 203/2 |
| 0663415 | 5/1979 | U.S.S.R. | 203/2 |
| 0710564 | 1/1980 | U.S.S.R. | 203/2 |
| 2144648 | 3/1985 | United Kingdom | 203/2 |

OTHER PUBLICATIONS

Derwent, "Soviet Inventions Illustrated," Jun. 3, 1981, Section Ch, Week 17.

Primary Examiner—Virginia Manoharan
Attorney, Agent, or Firm—Sprung Horn Kramer & Woods

[57] ABSTRACT

A process for the separation of multicomponent systems containing intermediate boiling substances in separating separating columns with side discharge, the temperatures $T_u$ and $T_o$ above and below the side discharge are measured on the column or inside the column and the temperature difference $T_u - T_o$ is used for controlling the side discharge. The control is carried out by constantly controlling one of the two temperatures $T_u$ or $T_o$ by the output of the evaporator or the discharge from the sump or the reflux or the removal of distillate or the reflux ratio.

4 Claims, 1 Drawing Sheet

PROCESS FOR THE SEPARATION OF MULTICOMPONENT SYSTEMS CONTAINING INTERMEDIATE BOILING SUBSTANCES IN SEPARATING COLUMNS WITH SIDE DISCHARGE

Multicomponent systems containing intermediate boiling substances are in many cases separated in a plurality of interconnected columns because control by side discharge could not hitherto be realised with high separation yields.

It has been attempted, for example, to separate 3,4 DBN (dichlorobutene) from 1,4 DBN (cis and trans) in the presence of low boiling substances by processes in which sump discharge and side discharge are operated with fixed discharge quantities.

It is also known to employ a temperature at the side discharge for controlling the side discharge. This method has the disadvantage that the control is either very non-linear in reaction and therefore difficult to adjust or the control signal can only be used within a very narrow operating range.

It has now surprisingly been found that when temperature differences within the column are used as control signal for the side discharge, the disadvantages hitherto encountered in side discharge control no longer occur and reliable control combined with high separation quality can be achieved.

The present invention thus relates to a process for the separation of multicomponent systems containing intermediate boiling substances in separating columns, preferably distillation columns, provided with side discharge, characterised in that a) the temperatures Tu (=below) and To (=above) are measured above and below the side discharge, either on the column or in the interior of the column, b) the temperature difference D Tu-To is used as signal for controlling the side discharge and c) Tu or To is regulated by known procedures on the basis of the rate of evaporation or the sump discharge or the reflux or the rate of removal of distillate or the reflux ratio.

The process according to the invention provides the following advantages:

a) The control process can also be used successfully in non-linear processes, b) the control reacts less sensitively to deviations in the control parameters (robust control!), c) a wider range of load can be covered by a single control setting, d) product losses via the side discharge are reduced, e) the components to be removed via the side discharge can be more highly concentrated, and f) an additional degree of freedom is introduced into the system, which can be used for an optimization of the process.

DESCRIPTION OF THE PREFERRED EMBODIMENT

Figure 1:
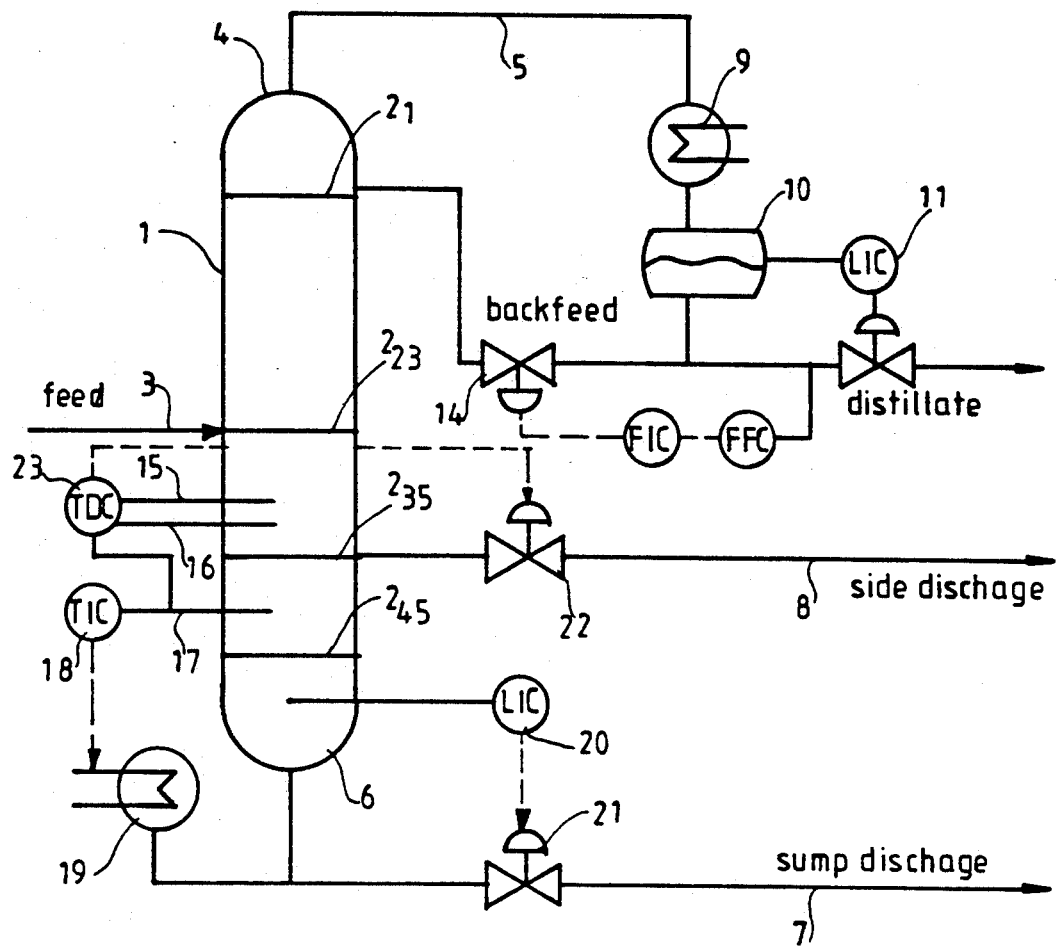
FIG. 1 shows a flow sheet of the control process.

The invention is described below with reference to a process scheme and a practical example.

The main part of the apparatus for carrying out the process according to the invention is the separating column 1 with plates $2_1$ to $2_{45}$.

The product to be separated is introduced through the intake 3 of the column 1. The separated components are removed at the head 4 via the head discharge 5, the sump 6 via the sump discharge 7 and the column 1 via the side discharge 8. The gaseous product removed at head 4 is condensed in a condenser 9 and collected as distillate in the following collecting vessel 10. The collecting vessel 10 is equipped with a level control 11. Part of the distillate is returned to the uppermost plate $2_1$ of column 1 by a controlled reflux. The reflux control 13 provides for a constant reflux ratio, i.e. the rate of reflux, based on the rate of removal from the head, is kept constant by suitable readjustment of the reflux valve 14.

The temperatures inside the column are measured at various points by the temperature sensors 15, 16, 17. The sensors 15 and 16 are arranged above the side discharge 8 and the sensor 17 below the side discharge 8. An average value To is formed from the temperatures measured by the sensors 15 and 16 while the lower sensor 17 supplies the temperature value Tu. The temperature control 18 keeps the temperature Tu constant by readjusting the evaporator heating 19 in the sump 6. The sump 6 is also provided with a level control 20 for which the sump discharge valve 21 serves as setting member. The temperature Tu could, alternatively, be controlled by means of the sump discharge or the reflux or the rate of removal of distillate or the reflux ratio as adjustment parameters. The difference signal D=Tu−To is formed from the temperature values To (average value of temperatures measured by sensors 15 and 16) and Tu (temperature at sensor 17). The difference signal D is then used as control signal for readjusting the side discharge valve 22 (difference control 23). Suitable readjustment of the side discharge valve 22 keeps the difference temperature D constant or at a nominal value determined by a characteristic curve.

The following separating columns are particularly suitable: Distillation columns, reaction columns, extractive distillative columns and azeotropic distillation columns. Distillation columns and extractive distillation columns are preferred. Particularly preferred are distillation columns, plate, filling body and packing columns having a side discharge for gases or liquids in the column stripper portion not situated directly above the sump discharge or below the head discharge.

The multicomponent systems may be any systems (gaseous or liquid) having boiling temperatures from −180° C. to +600° C., in particular multicomponent systems containing combinations of solvent and water or high boiling component or entraining agent such as tetraethylene glycol, and multicomponent systems whose main components have a relatively high volatility.

Intermediate boiling systems are systems of components having boiling temperatures between those of the two main components of the multicomponent system. The systems may contain two or more intermediate boiling components. More than 2 main components may also be present.

The control devices for the side discharge may be P controls, PI controls, PID controls, switching controls, two point controls with or without hysteresis, three point controls with or without hysteresis, cascade controls, adaptive controls, condition controls, frequency dependent controls, non-linear controls, predictive controls, model supported controls, multiple magnitude controls or decoupling controls.

The following are preferred controls: P controls, PI controls, PID controls, two point controls with or without hysteresis, adaptive controls, condition controls, non-linear controls, model supported controls and multiple magnitude controls. PI controls, two point controls with or without hysteresis, condition controls and model supported controls are particularly preferred.

The temperature measuring sensors may be thermometers, thermoelectric elements, resistance thermometers, PT100 or infra-red measuring devices. Thermoelectric elements, resistance thermometers and PT100 are preferred temperature measuring devices.

The temperature measurement above the side discharge and below the side discharge may in principle be located in any position provided it is situated at least one plate removed from the head or sump, respectively, of the column. The measuring locations are preferably chosen as follows:

a) Typically about 4 to 5 plates above the side discharge and below the side discharge or
b) by an empirical process for determining the measuring location, in which disturbances are introduced into the column and the resulting changes in the quantity of side discharge and/or the amount of intermediate boiling component are determined at sensitive temperature measuring points. By "sensitive" is meant in this context that the temperatures at the measuring points react rapidly and with sufficient amplitude to the above mentioned changes. One or more measuring points may be selected from these sensitive measuring points to serve as measuring/control magnitude. When more than one measuring point is used above or below the side discharge, a suitable average should be calculated for the given region;
c) alternatively, the position of the material exchange zones may be determined by means of measurements or simulations and the measuring probes for determining the temperature may be arranged in regions of large material exchange streams. When more than one measuring point is used above or below the side discharge, an average should be worked out for the given region.

In a particular embodiment of the process according to the invention, the column may be started with the side discharge closed until, for example, the concentration of the intermediate boiling components is sufficiently high at the outlet of the side discharge. This is the case when, for example, two regions with greatly varying plate temperatures (temperature fronts) have developed in the column. In that case, the temperature measurements are preferably located near the temperature fronts.

EXAMPLE OF PRACTICAL APPLICATION

A mixture having methanol (63%) and water (36%) as its main components and the intermediate boiling substance iso-butanol (1%) is separated in a distillation column having 44 separating stages so that the methanol is discharged in the head product with a degree of purity of 99.9% and the water is discharged in the sump product with a purity of 99.999% while the isobutanol is discharged in the side discharge for gases in the stripping part.

The column is operated at a constant reflux ratio of 1.7 and the sump level is controlled by the discharge of sump. Temperature measurements at the 29th (T29) and 31st (T31) plate are used to calculate an average value from the formula $$To=(T29+T31)/2.$$

The temperature measurement at the 41st plate (T41) is used as temperature below the side discharge Tu to form the control signal $$D=Tu-To.$$

The control factors D and Tu may now be used to develop either of the following two control strategies:
1. Tu is controlled by the heating vapor by means of a PI control and D is controlled by the quantity of side discharge by means of a PI control. This control enables the losses of methanol through the side discharge to be reduced.
2. Tu is controlled by the heating vapor by means of a PI control. The control signal D is used for a two point control in such a manner that the side discharge remains closed until a minimum temperature difference Dmin is established. At that moment, the side discharge is opened by a fixed amount by the control, and the size of this opening is maintained until the control signal reaches a maximum temperature difference Dmax. The side discharge is then closed by the control and the cycle is repeated. This control has the advantage over the continuous control strategy described under 1 that the medium boiling substance can be more highly concentrated so that the methanol losses can be even further reduced.

We claim:
1. A process for the distillation of a multicomponent composition in a distillation column having an evaporator, a condenser, an overhead product draw, a bottoms product draw and a side discharge comprising the steps of
  (a) measuring the temperature (To) at a point above the side discharge where the temperature reacts to changes in the side discharge;
  (b) measuring the temperature (Tu) at a point below the side discharge where the temperature reacts to changes in the side discharge;
  (c) determining the difference between the temperatures at said point above the side discharge and said temperature below said side discharge (Tu−To);
  (d) controlling the side discharge to maintain said temperature difference constant and
  (e) regulating either said temperature above said side discharge, or said temperature above said side discharge to remain constant by adjusting the rate of overhead product draw, bottoms product draw, the reflux ratio or the evaporator heating rate.
2. A process according to claim 1, wherein the column is started with the side discharge closed.
3. A process according to claim 1, wherein the position of a material exchange zones of main components and side components with the main components is determined by experimental calibration, and the temperature Tu and To at these positions above and below the side discharge are measured and then used for controlling the side discharge.
4. A process according to claim 1, wherein instead of using one temperature, an average value of two or more temperatures is used for Tu and/or To.

* * * * *

UNITED STATES PATENT AND TRADEMARK OFFICE
CERTIFICATE OF CORRECTION

PATENT NO. : 5,244,544

DATED : September 14, 1993

INVENTOR(S) : Lang, et al.

It is certified that error appears in the above-identified patent and that said Letters Patent is hereby corrected as shown below:

Title Page        ABSTRACT: Line 2 after " in " delete " separating "

Col. 4, line 51    Delete " above " and substitute -- below --

Signed and Sealed this

Seventeenth Day of January, 1995

Attest:

BRUCE LEHMAN

Attesting Officer      Commissioner of Patents and Trademarks